(12) United States Patent
Thome et al.

(10) Patent No.: US 11,630,489 B2
(45) Date of Patent: Apr. 18, 2023

(54) COMPUTING DEVICE WITH STYLUS RETENTION

(71) Applicant: Microsoft Technology Licensing, LLC, Redmond, WA (US)

(72) Inventors: Nathan Michael Thome, Redmond, WA (US); Robyn Rebecca Reed McLaughlin, Seattle, WA (US); Kaitlyn Marley Schoeck, Seattle, WA (US); Aseem Singla, Redmond, WA (US); Joseph Benjamin Gault, West Linn, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/451,444

(22) Filed: Oct. 19, 2021

(65) Prior Publication Data

US 2023/0067384 A1    Mar. 2, 2023

Related U.S. Application Data

(60) Provisional application No. 63/260,570, filed on Aug. 25, 2021.

(51) Int. Cl.
*G06F 1/16* (2006.01)

(52) U.S. Cl.
CPC ............ *G06F 1/166* (2013.01); *G06F 1/1618* (2013.01); *G06F 2200/1632* (2013.01)

(58) Field of Classification Search
CPC ........... G06F 1/1656; G06F 2200/1632; G06F 3/03545
See application file for complete search history.

(56) References Cited

U.S. PATENT DOCUMENTS 5,067,573 A * 11/1991 Uchida ................. G06F 1/1626
382/314
5,657,459 A * 8/1997 Yanagisawa ....... H01R 13/4536
345/169

(Continued)

FOREIGN PATENT DOCUMENTS

CN          201207178 Y     3/2009
KR       20160001563 A     1/2016

OTHER PUBLICATIONS

Dove, et al., "Infiland Case", Retrieved from: https://www.digitaltrends.com/mobile/best-samsung-galaxy-tab-s6-cases/, Jul. 26, 2021, 28 Pages.

(Continued)

*Primary Examiner* — Adrian S Wilson
(74) *Attorney, Agent, or Firm* — Alleman Hall Creasman & Tuttle LLP

(57) ABSTRACT

A computing device comprises a base that comprises a base surface configured to support the computing device on a supporting surface, and a front wall adjoining and extending away from the base surface. The computing device also includes a chassis adjoining the base, the chassis comprising a planar user interactive surface comprising one or more user input components. The chassis also comprises an overhanging brim that extends beyond at least the front wall of the base and comprises at least one magnet configured to removably retain a stylus underneath the overhanging brim.

20 Claims, 14 Drawing Sheets

(56) References Cited

U.S. PATENT DOCUMENTS

| | | | |
|---|---|---|---|
| 5,703,626 A * | 12/1997 | Itoh | G06F 3/03545 |
| | | | 345/173 |
| 5,750,939 A * | 5/1998 | Makinwa | G06F 3/03545 |
| | | | 178/19.03 |
| 5,898,427 A | 4/1999 | Okamoto | |
| 6,266,685 B1 | 7/2001 | Danielson et al. | |
| 8,363,036 B2 * | 1/2013 | Liang | G06F 1/1626 |
| | | | 361/679.01 |
| 9,063,693 B2 * | 6/2015 | Raken | G06F 1/189 |
| 9,268,379 B2 * | 2/2016 | Ashcraft | G06F 3/0393 |
| 9,317,142 B2 * | 4/2016 | Locker | G06F 3/03545 |
| 9,327,544 B2 * | 5/2016 | Ceruzzi | G06F 1/1628 |
| 9,395,753 B2 * | 7/2016 | Amano | B65D 25/005 |
| 9,545,147 B2 * | 1/2017 | Sadai | A45F 5/10 |
| 9,696,824 B2 * | 7/2017 | Cho | G06F 1/266 |
| 10,031,557 B1 * | 7/2018 | Morrison | G06F 1/189 |
| 10,135,480 B1 * | 11/2018 | Zaloom | F16M 11/10 |
| 10,139,926 B2 | 11/2018 | Murauyou et al. | |
| 10,153,077 B2 * | 12/2018 | Barel | G06F 3/04883 |
| 10,305,528 B2 * | 5/2019 | Zaloom | F16M 13/00 |
| 10,408,246 B2 * | 9/2019 | Hu | F16B 1/00 |
| 10,775,902 B2 * | 9/2020 | Wang | G06F 1/1683 |
| 10,802,617 B2 * | 10/2020 | Lin | G06F 3/03545 |
| 11,068,028 B1 * | 7/2021 | Cubrilovic | F21V 33/0052 |
| 2002/0101411 A1 * | 8/2002 | Chang | G06F 1/1626 |
| | | | 345/179 |
| 2003/0076302 A1 * | 4/2003 | Langstraat | G06F 1/169 |
| | | | 345/161 |
| 2006/0044288 A1 * | 3/2006 | Nakamura | G06F 3/03545 |
| | | | 345/179 |
| 2010/0021022 A1 * | 1/2010 | Pittel | G06F 3/03545 |
| | | | 206/320 |
| 2012/0013781 A1 * | 1/2012 | Yamagiwa | G06F 1/1626 |
| | | | 345/173 |
| 2013/0049345 A1 * | 2/2013 | Imbernino | B42D 3/12 |
| | | | 281/31 |
| 2013/0181098 A1 * | 7/2013 | Lin | H04M 1/04 |
| | | | 248/122.1 |
| 2013/0335903 A1 * | 12/2013 | Raken | G06F 1/189 |
| | | | 361/679.4 |
| 2014/0029182 A1 * | 1/2014 | Ashcraft | G06F 3/03545 |
| | | | 361/679.4 |
| 2017/0060180 A1 * | 3/2017 | Griffin, II | G06F 1/1669 |
| 2018/0053588 A1 * | 2/2018 | Barel | G06F 3/04883 |
| 2020/0089341 A1 * | 3/2020 | Wang | H05K 5/0217 |
| 2021/0037666 A1 | 2/2021 | Kang et al. | |
| 2021/0099025 A1 | 4/2021 | Gaule et al. | |
| 2021/0353051 A1 * | 11/2021 | Phifer | F16M 13/00 |

OTHER PUBLICATIONS

"International Search Report and Written Opinion Issued in PCT Application No. PCT/US22/035634", dated Nov. 8, 2022, 12 Pages.

* cited by examiner

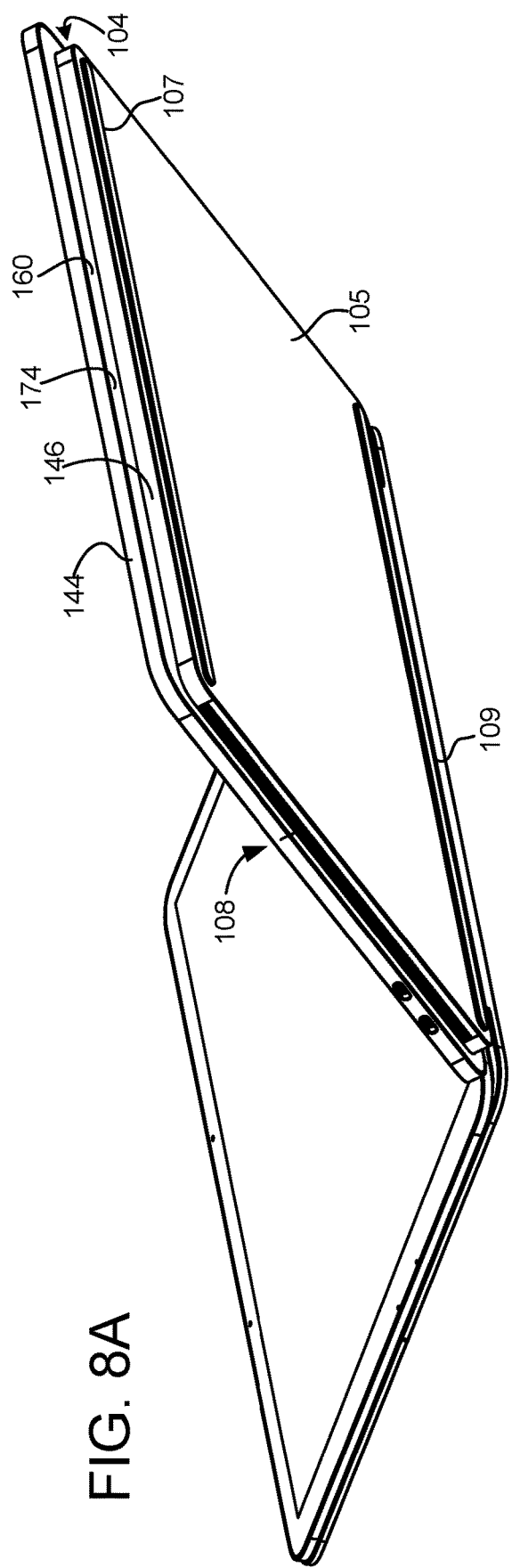
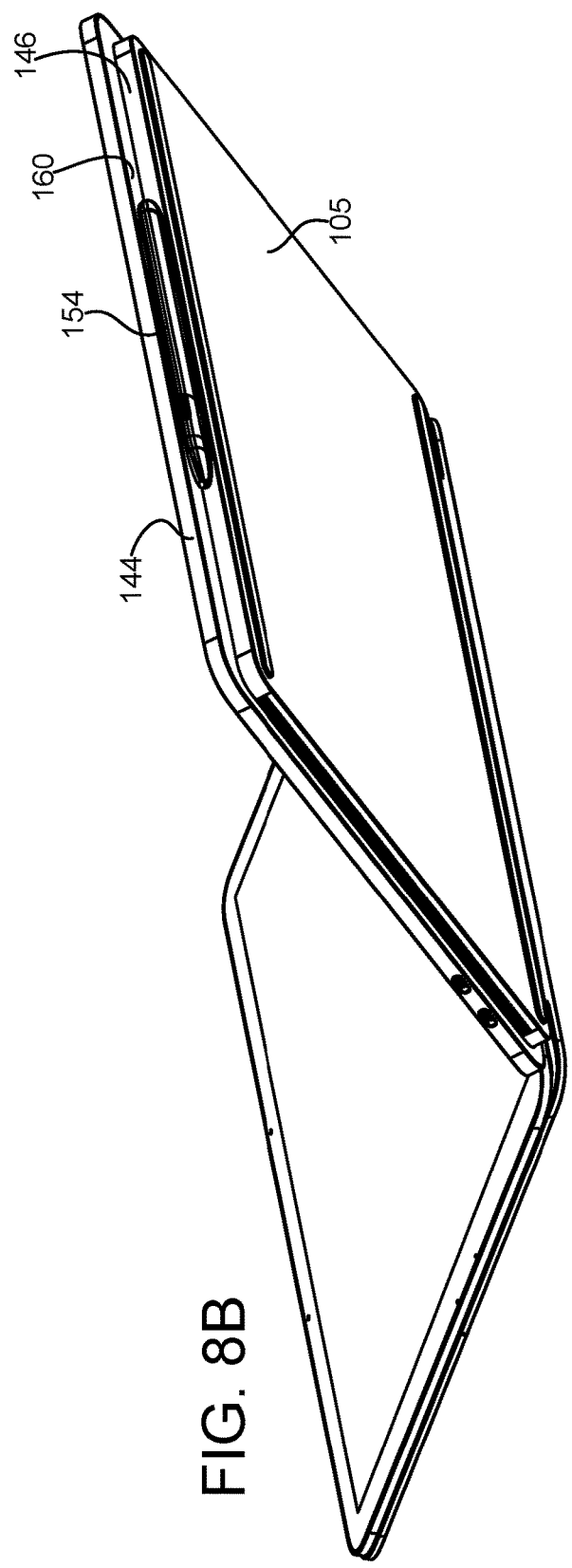
FIG. 8A
FIG. 8B

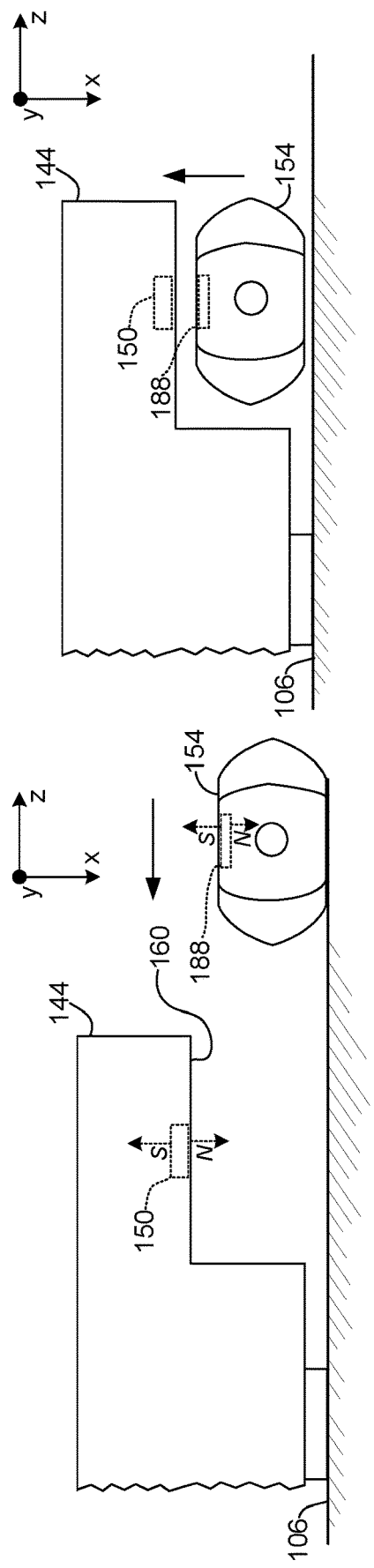
FIG. 21
FIG. 22
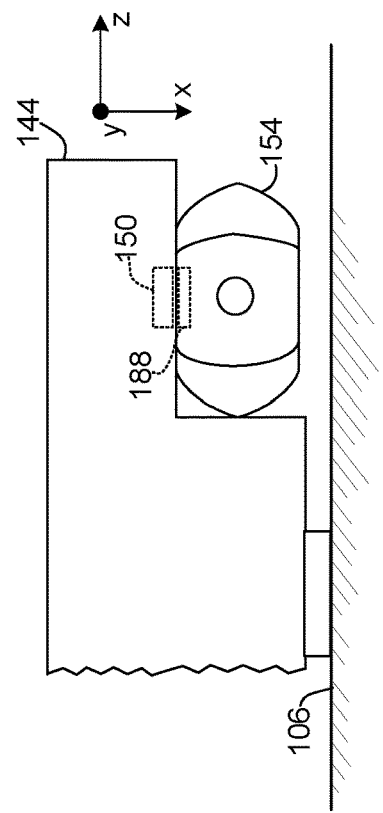
FIG. 23

COMPUTING DEVICE WITH STYLUS RETENTION

CROSS REFERENCE TO RELATED APPLICATIONS

This application claims priority to U.S. Provisional Patent Application Ser. No. 63/260,570, filed Aug. 25, 2021, the entirety of which is hereby incorporated herein by reference for all purposes.

BACKGROUND

Some electronic devices, such as laptop and tablet computers, can utilize a stylus as an input device. Storing the stylus with the electronic device can present challenges.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing device comprises a base that includes a base surface configured to support the computing device on a supporting surface. A front wall adjoins and extends away from the base surface. The computing device includes a chassis that adjoins the base, with the chassis comprising a planar user interactive surface comprising one or more user input components. An overhanging brim extends beyond at least the front wall of the base and comprises at least one magnet configured to removably retain a stylus underneath the overhanging brim.

BRIEF DESCRIPTION OF THE DRAWINGS

FIGS. 8A and 8B show the computing device without a stylus docked and with a stylus docked, respectively, according to examples of the present disclosure.

FIGS. 21-23 schematically show a stylus being removably attached to the computing device according to examples of the present disclosure.

DETAILED DESCRIPTION

Figure 1:
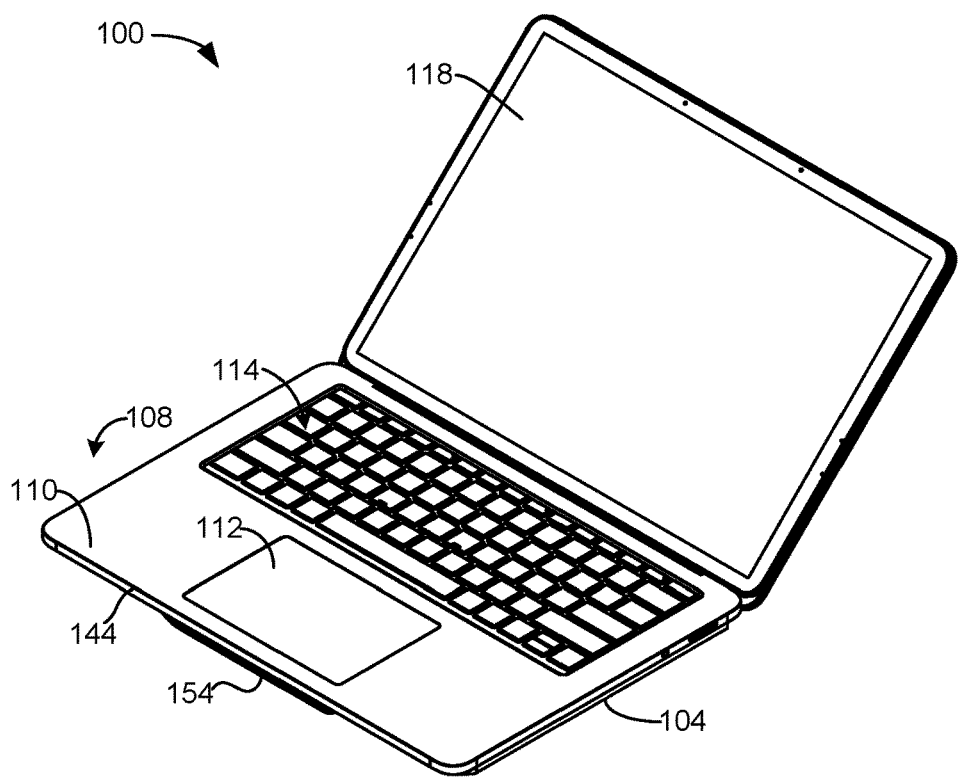
FIGS. 1 and 2 depict an example computing device including features for removably attaching a stylus according to examples of the present disclosure.

Many portable computing devices, such as laptop, tablet, and dual-display computing devices, may be utilized with a stylus as an input device. Existing storage solutions for carrying a stylus with a computing device have several drawbacks. Some configurations that magnetically attach a stylus to an exterior side of a device leave the stylus vulnerable to easy dislodging in a variety of situations, such as by a user's hand contacting the stylus, or by the stylus brushing against a surface of a carrying case or bag when inserting or removing the computing device from the case or bag. Other configurations may utilize a mechanical capture feature that requires a precise motion or series of movements with a user's fingers for inserting/removing the stylus. However, such mechanisms may be inaccessible and/or particularly difficult to operate for users with compromised fine motor skills. These solutions also can consume valuable packaging space within the computing device.

Other solutions utilize a dedicated cavity or void within the computing device, which also takes up valuable real estate inside the device, and often can compromise the exterior aesthetics of the device. Still other solutions require a separate cover that is attached to the computing device, thereby increasing the weight and size of the device, and imposing additional costs upon the user.

Accordingly, and to address one or more of the shortcomings of other solutions, the present disclosure describes computing devices and related methods that removably retain a stylus with the computing device in a manner that provides greater security from inadvertently dislodging the stylus, thereby enhancing portability of the device. Additionally, the computing devices and methods of the present disclosure make a stored stylus equally accessible regardless of the user's dominant hand, as well as easily accessible from any orientation or working mode of the device.

As will be described in more detail below, computing devices of the present disclosure include an overhanging brim that comprises one or more magnets configured to removably retain the stylus underneath the overhanging brim. With these configurations, the stylus may be easily and conveniently stowed and retrieved from the overhanging brim. Further, the overhanging brim utilizes a flat, planar surface against which the stylus is retained, thereby avoiding the use of troughs, indentations, or other intrusions into the device interior which could occupy valuable component space or other interior volumes. Additionally, when a stylus is not retained against this planar surface, the computing device presents a clean, aesthetically pleasing appearance, as opposed to other stylus retention configurations that are clearly visible and sometimes unsightly when a stylus is not stowed, and thus can present an incomplete and less-pleasing appearance to a user.

FIGS. 1-4 depict an example computing device 100 that includes stylus storage features according to aspects of the present disclosure. In this example, the computing device 100 includes a base 104 and adjoining chassis 108. In some examples, the base 104 and chassis 108 may be separately fabricated enclosures that are affixed together. In other examples, the base 104 and chassis 108 may be integrally formed as a single enclosure.

The base 104 includes a planar base surface 105 that is configured to support the computing device 100 on a supporting surface 106, such as a table, desk, a user's lap, etc. In this example and with reference also to FIGS. 8A and 8B, the base surface 105 includes two laterally extending feet 107, 109 that contact the supporting surface 106. The chassis 108 is positioned above the base 104 and includes a planar user interactive surface 110 comprising a trackpad 112 and a keyboard 114. In other examples of computing devices according to the present disclosure, the chassis may include a single user input component, such as a touch-sensitive display, or three of more user input components, such as a touch-sensitive display, trackpad and keyboard. For example, while computing device 100 includes trackpad 112 and keyboard 114, other computing devices utilizing stylus retention configurations of the present disclosure may omit either or both of these user input components, and/or include one or more other user input/output devices and other hardware components not discussed herein.

In this example, computing device 100 includes a touch-sensitive display 118 that is rotatably coupled to chassis 108 via a display positioning assembly 122. The display 118 may have any suitable size, resolution, and utilize any suitable display technology. As examples, the display 118 may be a liquid crystal display (LCD), light emitting diode (LED) display, plasma display, quantum dot display (QLED), e-ink/e-paper display, or other suitable display type. Additional details regarding the components and computing aspects of computing device 100 are described in more detail below with reference to the example computing system of FIG. 26.

In the present example, and with reference to FIGS. 1-7, the display positioning assembly 122 enables multiple operating orientations and positionings of display 118 that provide a user with different modes of interacting with the computing device 100. As best seen in FIGS. 2 and 5-7, the display positioning assembly 122 includes a collapsible support member 126 that is rotatably connected to the chassis 108 at a hinge 130. The bottom edge 134 of display 118 is not rigidly affixed to the user interactive surface 110 of the chassis 108. Rather, the bottom edge 134 of display 118 is moveable to any of a range of securable display positions along the user interactive surface 110.

In some examples, the collapsible support member 126 is moveably coupled to the display 118 via a living hinge 136. In other examples, the collapsible support member 126 may be moveably coupled to the display portion 108 via a mechanical hinge or any other suitable coupling that enables the display portion to pivot about the support member.

Components of computing device 100 may be composed or constructed from any suitable materials. As examples, a chassis of computing device 100 may be constructed from one or more suitable plastics, metal alloys (e.g., aluminum, magnesium), ceramics, etc. Suitable paints, coatings, or finishes may optionally be applied. It will be understood that computing device 100 and example stylus retention configurations as described herein are presented as nonlimiting examples for illustrative purposes and are schematic in nature. Other computing devices and stylus retention configurations contemplated by this disclosure may have alternate shapes, sizes, dimensions, and form factors.

Figure 2:
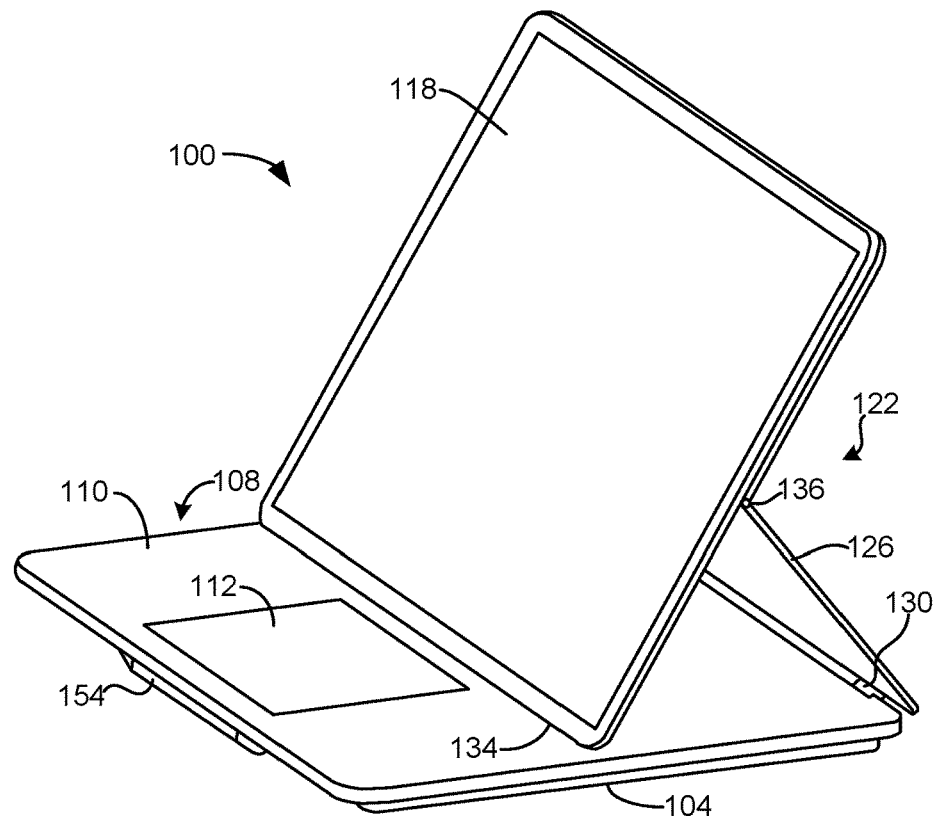
Figure 3:
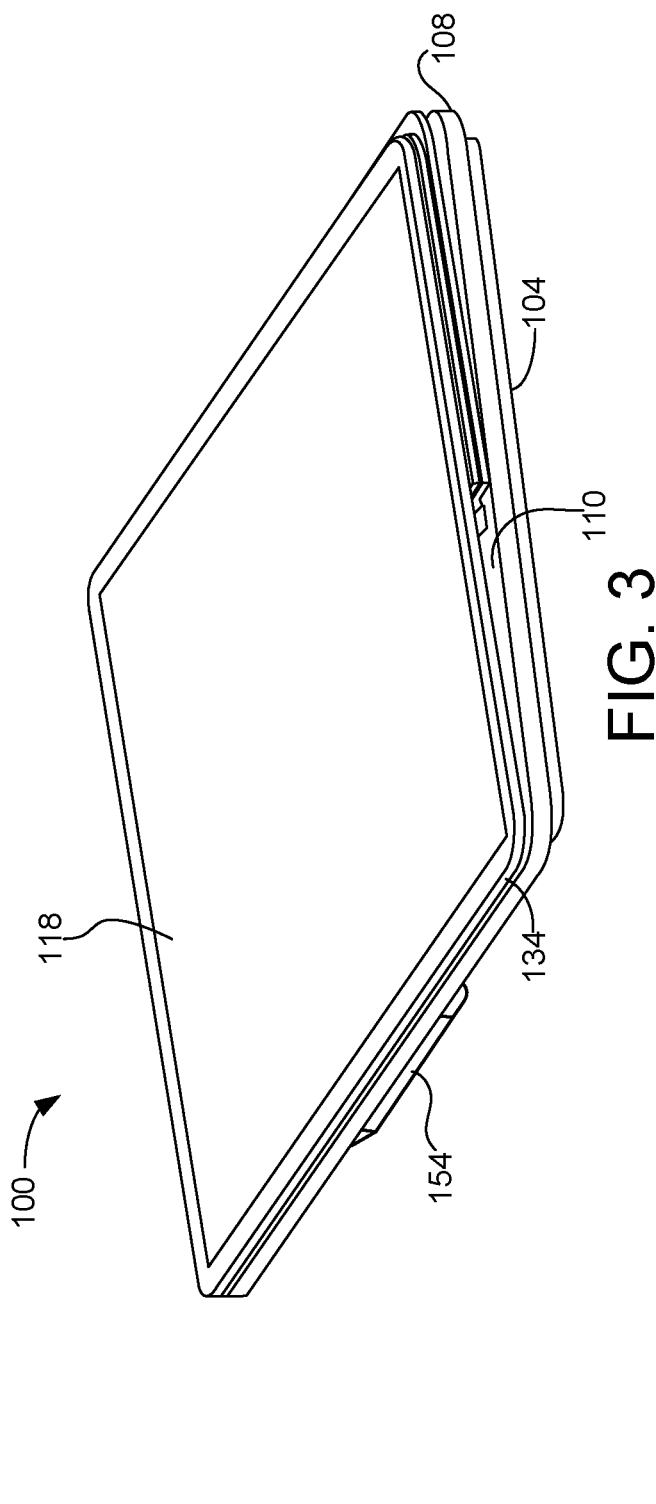
FIG. 3 depicts the example computing device of FIG. 1 in a tablet mode according to examples of the present disclosure.
Figure 4:
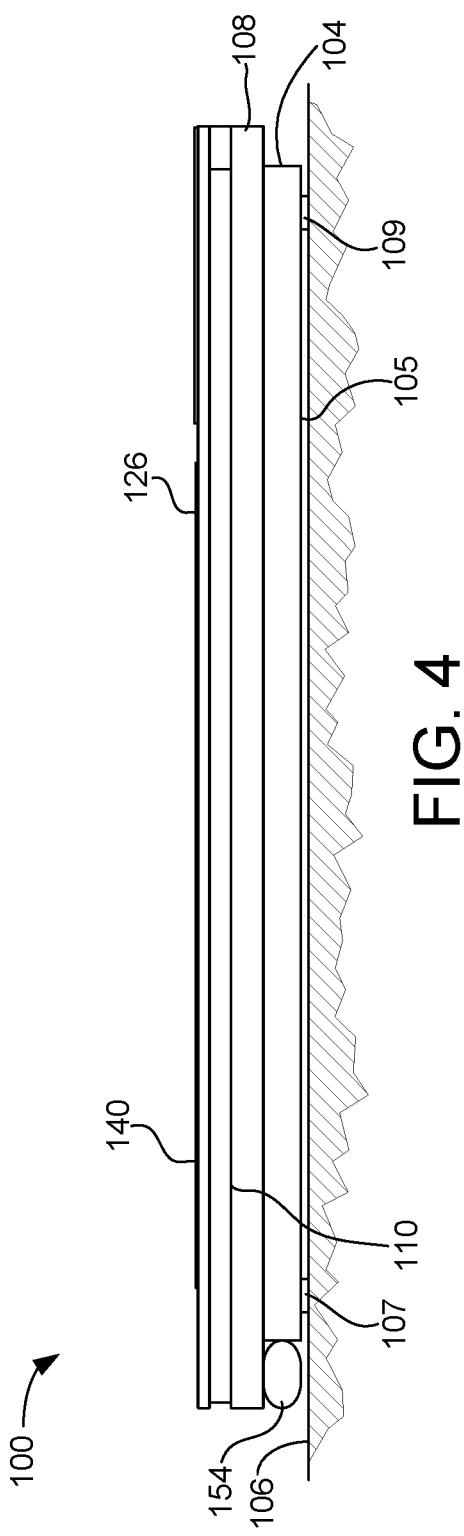
FIG. 4 shows a side view of the computing device of FIG. 1 in a closed position according to examples of the present disclosure.
Figure 5:
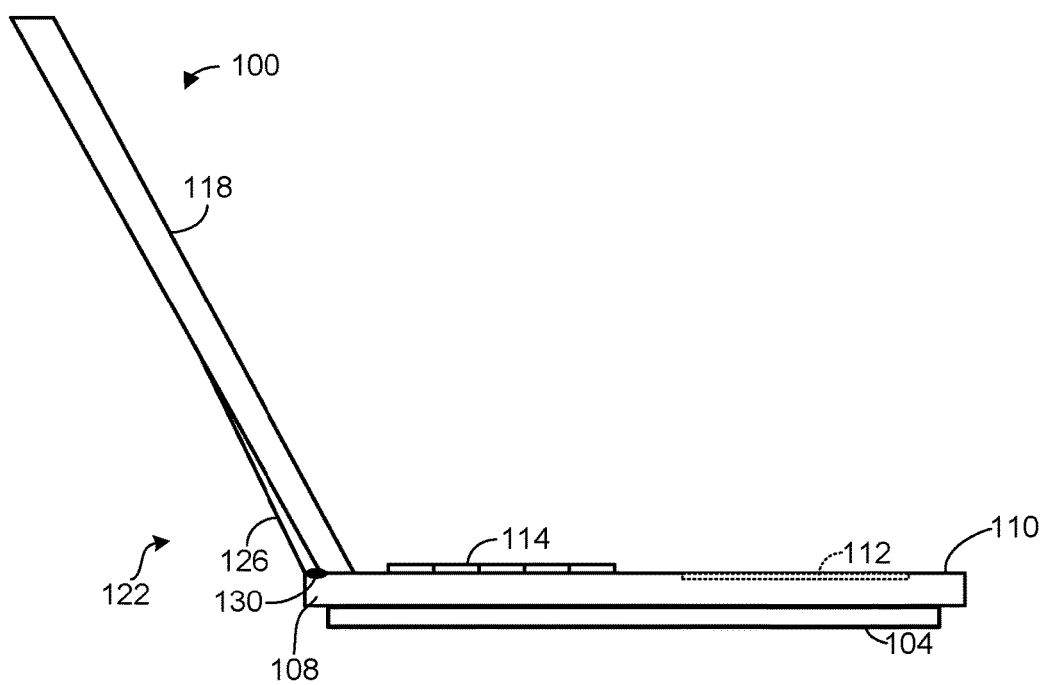
FIG. 5 schematically depicts a side view of the computing device in a laptop mode according to examples of the present disclosure.
Figure 6:
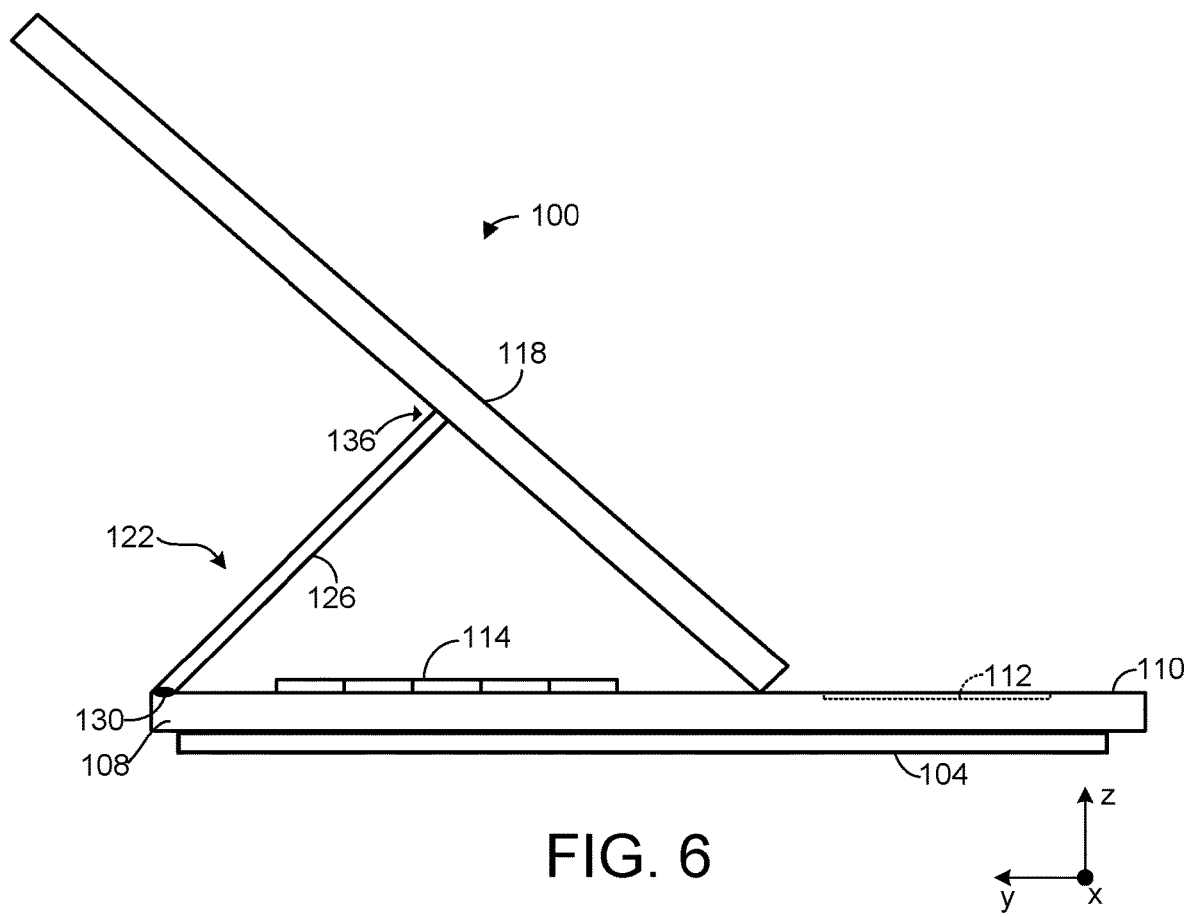
FIG. 6 schematically depicts a side view of the computing device with its display in an intermediate position according to examples of the present disclosure.
Figure 7:
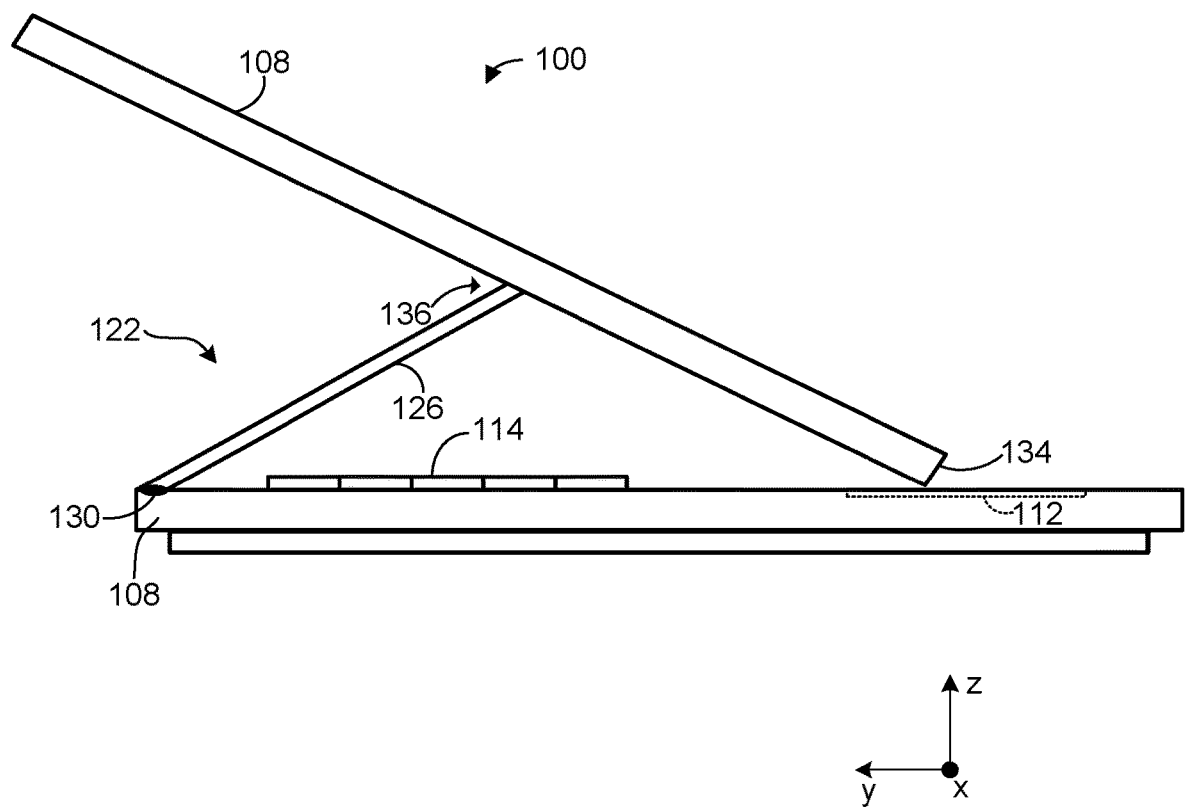
FIG. 7 schematically depicts a side view of the computing device with its display in another intermediate position according to examples of the present disclosure.

FIGS. 1 and 5 depict the computing device 100 in a laptop mode in which the display 118 is positioned relative to the chassis 108 in a manner similar to a laptop computing device. From this orientation and with reference to FIG. 4, the display 118 may be rotated about hinge 130 to a closed position in which the display 118 faces the user interactive surface 110 and a rear panel 140 of display 118 faces upwardly. With reference to FIGS. 2, 6, and 7, and as noted above, the display 118 also may be positioned in a variety of viewing orientations by rotating the display about living hinge 136 and moving the bottom edge 134 of the display to different locations along the user interactive surface 110. As shown in FIG. 3, the display 118 also may be positioned in a tablet mode in which the display rests generally parallel to the user interactive surface 110 and chassis 108 to create a tablet-like user experience.

With reference now to FIGS. 8-23 and as noted above, computing devices of the present disclosure include an overhanging brim that comprises one or more magnets configured to removably retain the stylus underneath the overhanging brim. More particularly, and as described in more detail below, in this example the chassis 108 includes overhanging brim 144 that extends beyond a front wall 146 of the base 104 and comprises two magnets 150, 152 (see FIGS. 15 and 16) that are configured to removably retain a stylus 154 underneath the overhanging brim. The front wall 146 adjoins the base surface 105 of base 104 and extends away from the base surface.

Figure 9:
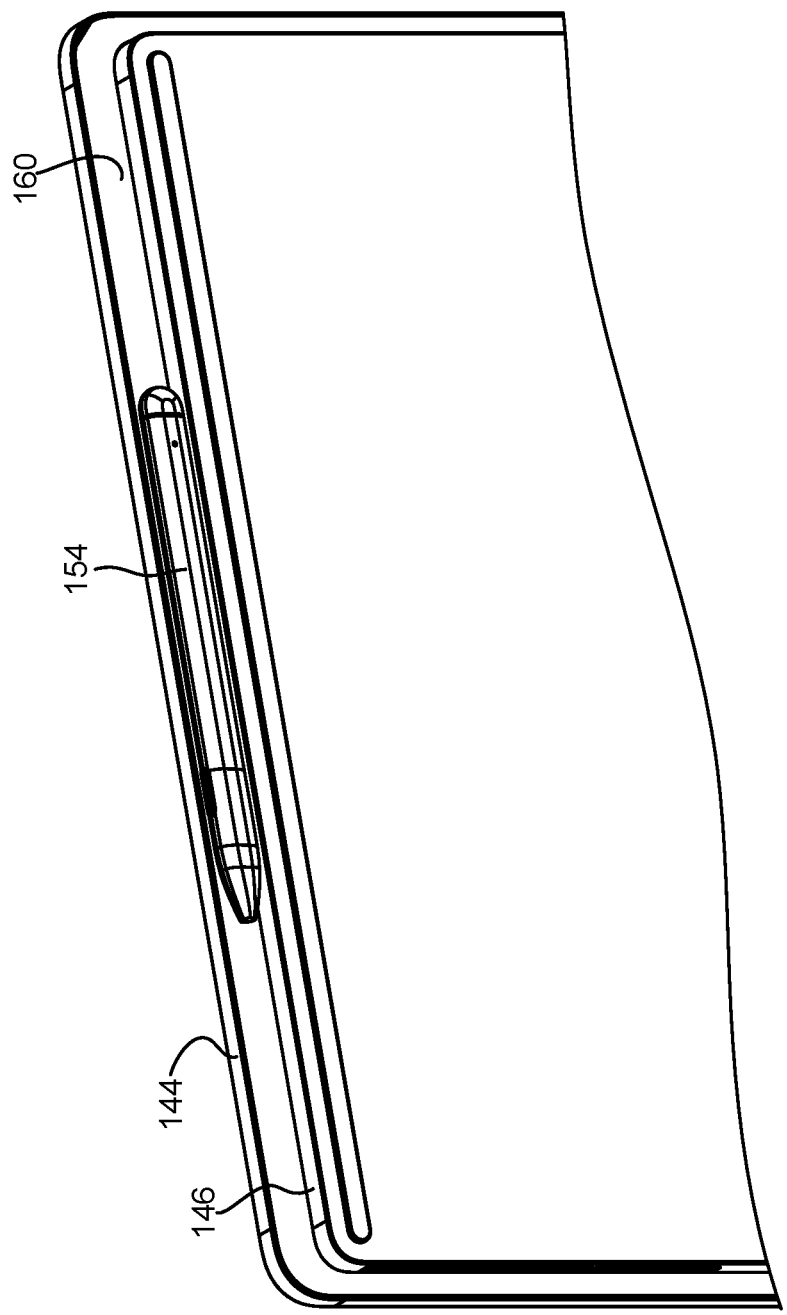
FIG. 9 shows another view of the computing device with a stylus docked according to examples of the present disclosure.
Figure 10:
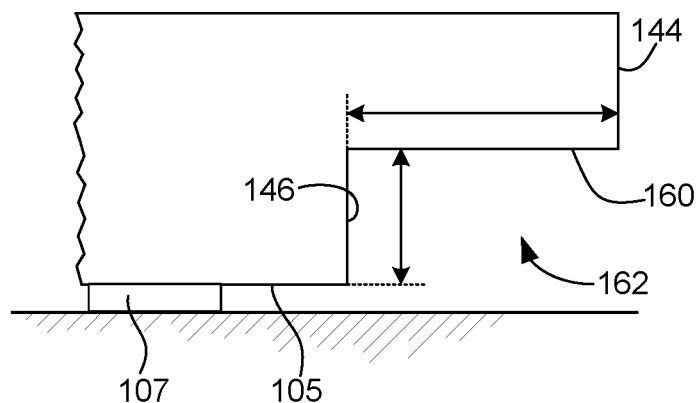
FIGS. 10 and 11 schematically depict partial side views of the overhanging brim of the computing device according to examples of the present disclosure.
Figure 11:
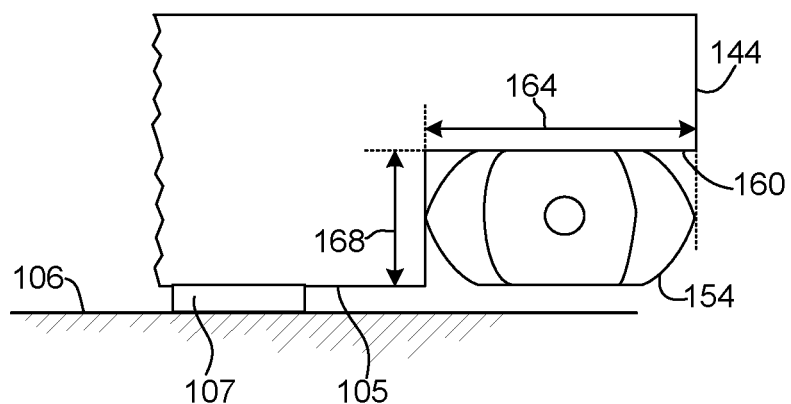

With reference to FIGS. 9-11, the overhanging brim 144 includes a planar ceiling 160 that forms an L-shaped capture feature 162 with the front wall 146 of the base 104. As shown in FIGS. 10 and 11, in this example the planar ceiling 160 extends perpendicularly from the front wall 146. As described further below, the two magnets 150, 152 within the overhanging brim 144 removably retain the stylus 154 against the planar ceiling 160.

As shown in FIG. 11, in this example a brim width 164 of the overhanging brim 144 is substantially equal to the stylus width of the stylus 154. Additionally, a wall height 168 of the front wall 146 of the base 104 is substantially equal to the stylus thickness of the stylus 154. Accordingly, and in one potential advantage of the present disclosure, coordinating these dimensions of the overhanging brim 144 and front wall 146 with corresponding dimensions of the stylus 154 can effectively protect the stylus from inadvertent contact from outside surfaces, such as a user's finger or hand, or a surface of a carrying case or bag when the computing device 100 is being inserted into or removed from the case or bag.

In other examples, and to provide additional protection from inadvertent dislodgements, the brim width 164 of the overhanging brim 144 is greater than the stylus width of the stylus 154 to further shield the stylus from unintended contact. Additionally or alternatively, to provide additional protection from inadvertent dislodgements, the wall height 168 of the front wall 146 of the base 104 is greater than the stylus thickness of the stylus 154 to further shield the stylus from unintended contact.

Advantageously and as shown in FIG. 11, this configuration also elevates the stylus 154 above the supporting surface 106 to provide the user with additional space to easily reach under the overhanging brim 144 with a finger and conveniently remove the stylus from its stowed position. Further, this configuration makes a stored stylus equally accessible regardless of the user's dominant hand, as well as easily accessible from any orientation or working mode of the device. Additionally and as described in more detail below, this configuration enables a user-friendly and highly accessible method for storing the stylus 154 by simply sliding the stylus on the supporting surface 106 and underneath the overhanging brim 144, whereby the magnets 150, 152 are configured to attract and lift the stylus into its stowed position against the planar ceiling 160.

It will also be appreciated that in other examples, computing devices of the present disclosure may be utilized with other styli having shapes, sizes, and cross-sectional profiles that are different from the stylus 154 depicted in these examples.

In another potential advantage of the present disclosure, the overhanging brim 144 is configured to at least partially shield the stylus 154 from view when the stylus is retained against the planar ceiling 160 and is viewed from above the planar user interactive surface 110. For example and as best seen in FIGS. 1 and 2, when the computing device 100 is sitting on a supporting surface with the stylus 154 stowed underneath the overhanging brim 144, a user viewing the computing device from above sees primarily the display 118, user interactive surface 110, and overhanging brim, with the stylus 154 partially occluded from view by the overhanging brim.

Figure 12:
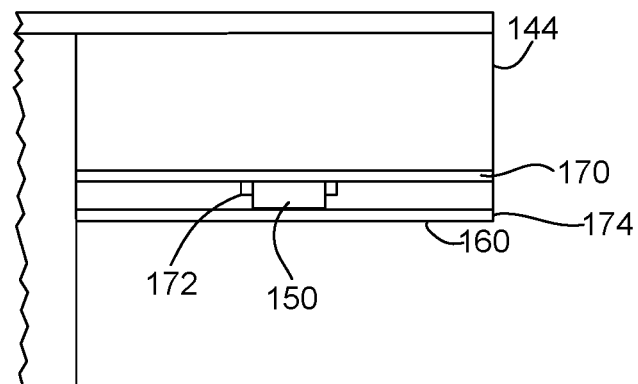
FIG. 12 shows a partial cross section view of the overhanging brim according to examples of the present disclosure.
Figure 15:
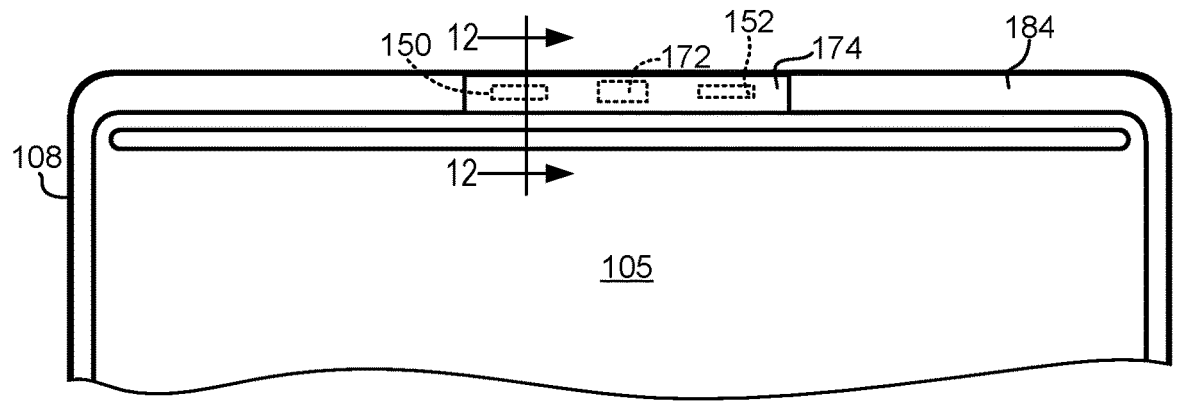
FIG. 15 depicts a plastic shim that overlies a printed circuit board assembly, magnets, and a wireless charging component according to examples of the present disclosure.

With reference now to FIG. 12 which shows a partial cross section view of the overhanging brim 144 taken along section line 12-12 in FIG. 15, in this example the overhanging brim 144 is an enclosure containing additional components, such as magnets 150, 152 (see also FIG. 16), printed circuit board assembly 170, and wireless charging component 172. Accordingly, and in another potential advantage of the present disclosure, because the overhanging brim 144 utilizes a flat, planar ceiling 160 against which the stylus is retained, it thereby avoids the use of any troughs, indentations, or other intrusions into the interior space of the brim or other areas of the computing device 100. It follows that this potentially valuable device space is preserved for other purposes, such as housing printed circuit board assembly 170, magnets 150, 152, and wireless charging component 172 in the example computing device 100. Additionally, and unlike computing devices that include troughs, indentations or other visually conspicuous features dedicated to retaining a stylus, this configuration utilizing a flat, planar ceiling 160 provides a uniform and complete appearance when a stylus 154 is not present.

Additionally, with reference also to FIG. 15 and in another potential advantage of the present disclosure, the planar ceiling 160 comprises a plastic shim 174 that overlies the printed circuit board assembly 170, magnets 150, 152 and the wireless charging component 172. More particularly, and as depicted in FIGS. 13-17, the planar ceiling 160 comprises a plurality of layers that are configured to provide packaging space for the printed circuit board assembly 170, magnets 150, 152, and wireless charging component 172, while also providing a uniform visual appearance when the stylus 154 is not retained against the planar ceiling. Further, in another potential advantage and as described in more detail below, the planar ceiling 160 is fabricated to contain these components and provide this uniform visual appearance while also transmitting the magnetic fields of magnets 150, 152 and allowing for wireless charging of the stylus 154 when the stylus is retained against the planar ceiling.

Figure 13:
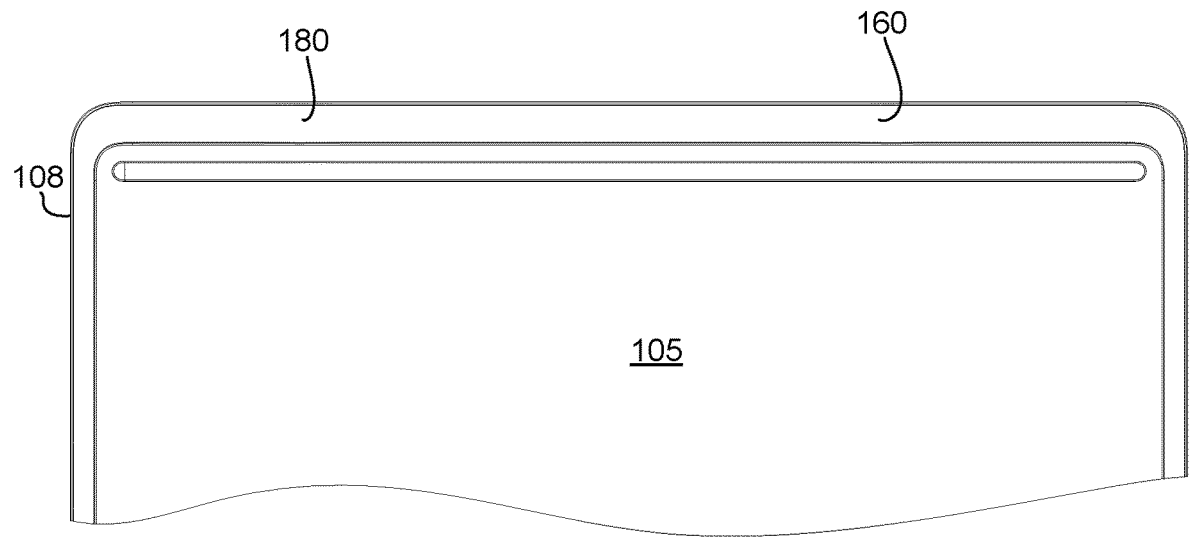
FIG. 13 depicts an outer layer of the planar ceiling of the overhanging brim according to examples of the present disclosure.

FIG. 13 depicts an outer layer 180 that forms the outer surface of planar ceiling 160. In this example, the outer layer 180 continues around the sides of the chassis 108. In this example, the outer layer 180 takes the form of a plastic outer layer that advantageously allows the magnetic fields generated by the magnets 150, 152 and the wireless charging component 172, such as a wireless charging coil, to propagate through the plastic outer layer 180. The plastic outer layer 180 also hides from view the printed circuit board assembly 170 and other components located beneath the plastic outer layer as described further below.

Figure 14:
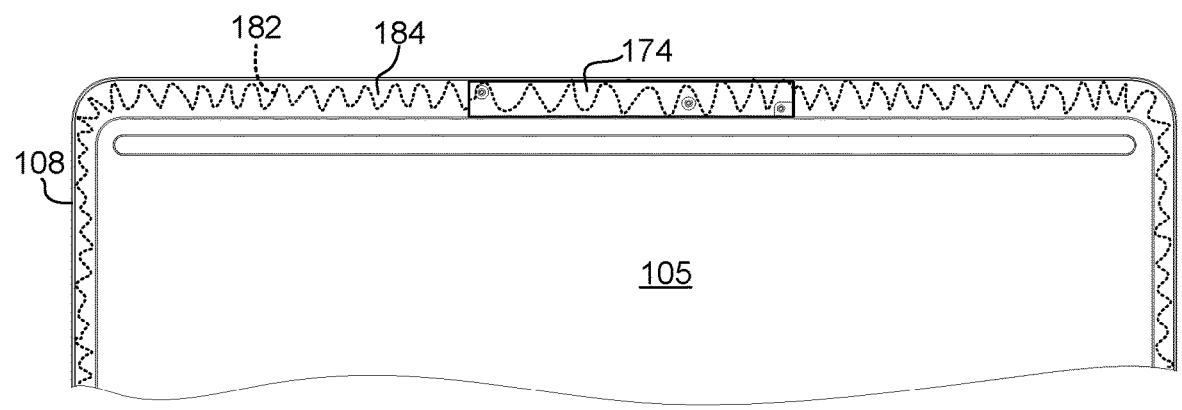
FIG. 14 depicts an adhesive layer underlying the outer layer according to examples of the present disclosure.
Figure 16:
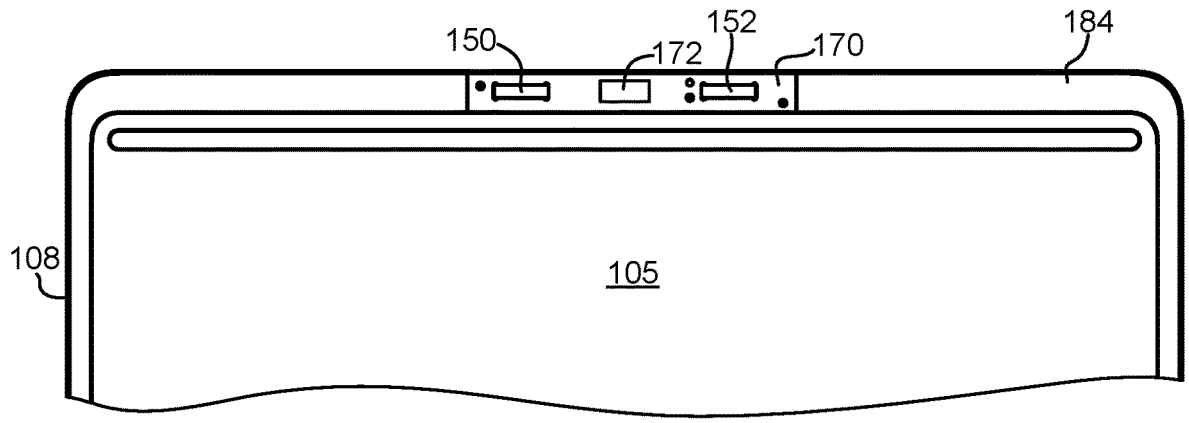
FIG. 16 shows the printed circuit board assembly, magnets, and wireless charging component according to examples of the present disclosure.
Figure 17:
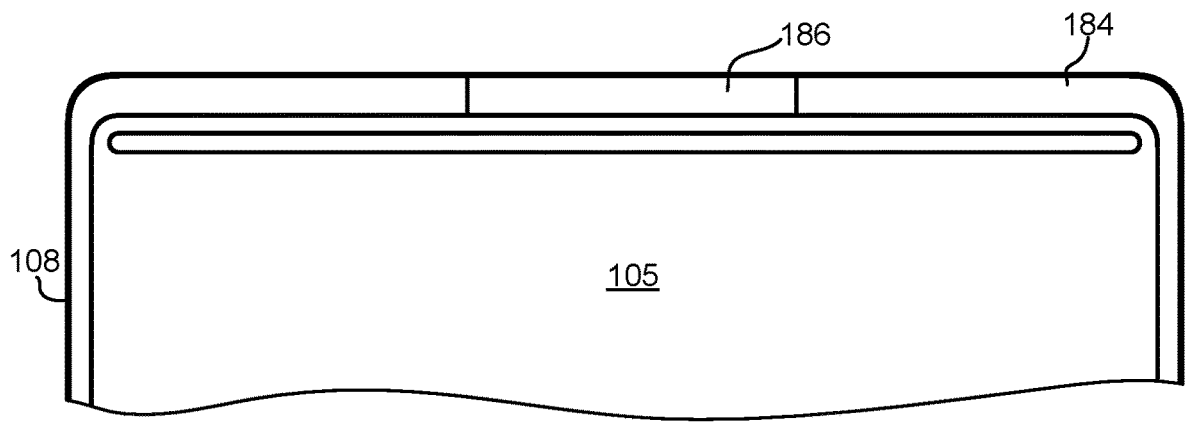
FIG. 17 shows a cutout portion in a metallic enclosure layer that houses the printed circuit board assembly according to examples of the present disclosure.

With reference now to FIG. 14, underlying the plastic outer layer 180 is an adhesive layer, such as a pressure sensitive adhesive 182 indicated in dashed lines, that bonds the outer plastic layer to an underlying metallic enclosure layer 184. In different examples, the metallic enclosure layer 184 can be fabricated from aluminum alloys, magnesium alloys, and/or other suitable materials. With reference now to FIGS. 16 and 17, the metallic enclosure layer 184 comprises a cutout portion 186 that houses the printed circuit board assembly 170. In this example, both magnets 150 and 152 are affixed to the printed circuit board assembly 170 at spaced apart locations. The wireless charging component 172 is positioned between the magnets 150, 152. As described in more detail below, the magnets 150, 152 and wireless charging component 172 are positioned to correspond with partner magnets and a partner wireless charging component in stylus 154 to enable convenient charging of the stylus when the stylus is magnetically retained against the planar ceiling 160 by magnets 150, 152.

As noted above and depicted in FIG. 15, a plastic shim 174 is positioned within the cutout portion 186 and overlies the printed circuit board assembly 170, magnets 150, 152 and the wireless charging component 172. Advantageously, the plastic shim is positioned to be coplanar with the metallic enclosure layer 184 on either side of the cutout portion 186 to provide a substantially continuous surface across the planar ceiling 160. Further, the plastic material of the shim 174 allows transmission of the magnetic fields of magnets 150, 152 and wireless charging energy of wireless charging component 172.

As noted above, magnets 150, 152 and wireless charging component 172 are positioned to correspond with partner magnets and a partner wireless charging component in stylus 154 to enable convenient charging of the stylus when it is magnetically retained against the planar ceiling 160 by the magnets 150, 152. In one example and with reference to FIGS. 18, 19, and 21, stylus 154 includes partner magnets 188, 192 that have a first magnetic pole orientation in which the south pole of each magnet is directed in the negative x-axis direction (see FIG. 21) and the north pole of each magnet is correspondingly directed in the positive x-axis direction. In this example the partner magnets 188, 192 are colinear and arranged along a line parallel to the longitudinal axis of the stylus 154. In other examples, the magnetic pole orientation of the partner magnets is reversed, with the magnetic pole orientations of the computing device magnets described below also reversed.

To magnetically attract the stylus 154 to a desired location on the planar ceiling 160, in the computing device the two magnets 150, 152 each have a second magnetic pole orientation that is opposite to the first magnetic pole orientation of the partner magnets 188, 192 of the stylus. In this example and as schematically shown in FIG. 21, the two magnets 150, 152 both have a second magnetic pole orientation in which the north pole of the magnet is directed in the positive x-axis direction and the south pole of the magnet is directed in the negative x-axis direction. Additionally, the two magnets 150, 152 are spaced apart by the same separation distance that separates the partner magnets 188, 192 of the stylus 154.

Figure 18:
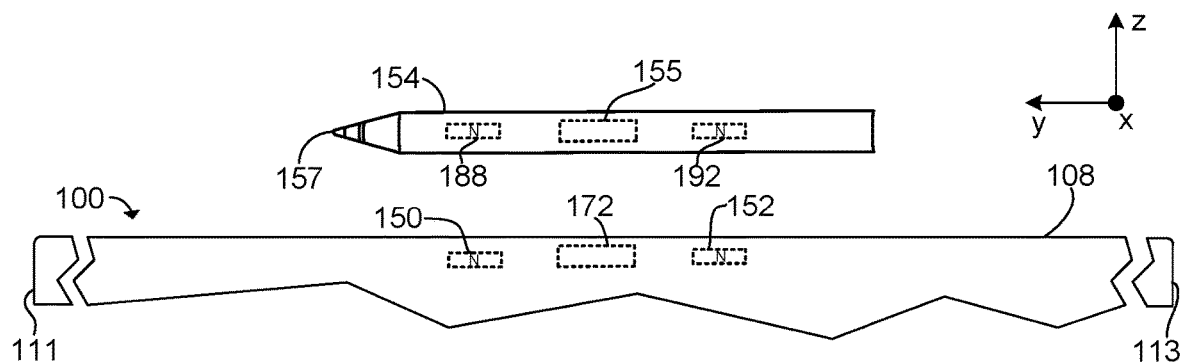
FIGS. 18 and 19 schematically depict a bottom view of the computing device showing magnets and wireless charging components in the stylus and computing device according to examples of the present disclosure.
Figure 19:
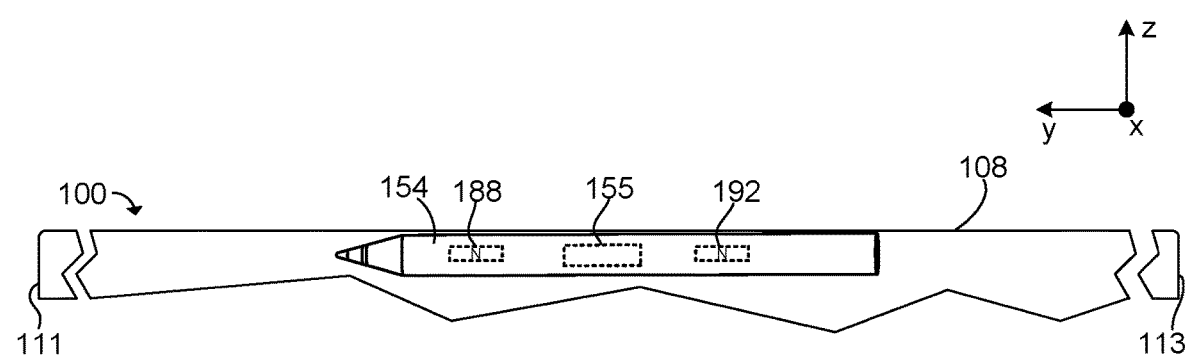
Figure 20:
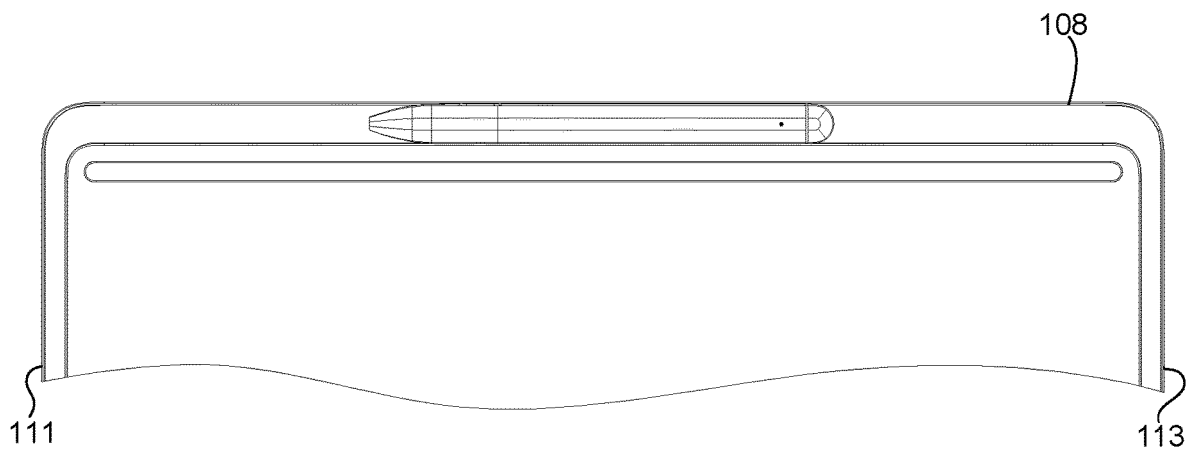
FIG. 20 shows the stylus docked to the computing device according to examples of the present disclosure.

Accordingly, with this configuration the stylus 154 can be positioned in an attaching/charging orientation relative to the computing device 100 as shown in FIG. 18, in which the longitudinal axis of the stylus 154 is substantially parallel to the end of chassis 108, and the tip 157 of the input device points toward the first end 111 of the chassis. Accordingly, and with reference to FIGS. 19 and 20, as the stylus 154 is moved closer to the computing device 100, the magnetic fields of the partner magnets 188, 192 are attracted to the opposing magnetic fields of the two magnets 150, 152, and the stylus 154 is magnetically pulled and attached to the ceiling 160 of chassis 108 at an attaching location on the computing device as shown. Additionally, and in this example, when the stylus 154 is secured to the computing device, the partner wireless charging component 155 is aligned with and positioned directly adjacent to the computing device wireless charging component 172 to enable efficient wireless charging of the stylus 154. Additionally, this configuration of magnets conveniently allows the stylus 154 to be rotated 180 degrees and magnetically retained to the computing device 100 in a similar position in which the wireless charging component 155 is aligned with and positioned directly adjacent to the computing device wireless charging component 172 to enable efficient wireless charging.

With reference now to FIGS. 21-23, configurations of the present disclosure also enable a particularly convenient method of removably attaching a stylus to the computing device 100. With reference also to FIG. 4, the computing device 100 is set on a planar supporting surface 106 to orient the planar ceiling 160 of the overhanging brim 144 parallel to the supporting surface. The stylus 154 is also placed on the supporting surface and then is moved underneath the planar ceiling 160 of the overhanging brim 144. As the stylus 154 moves underneath the planar ceiling 160, the two magnets 150, 152 magnetically attract the stylus partner magnets 188, 192, lift the stylus off the supporting surface 106, and retain the stylus against the planar ceiling. In this manner, a user can easily and simply slide the stylus 154 underneath the overhanging brim 144 and thereby cause the computing device 100 to lift and secure the stylus to the planar ceiling 160.

Figure 24:
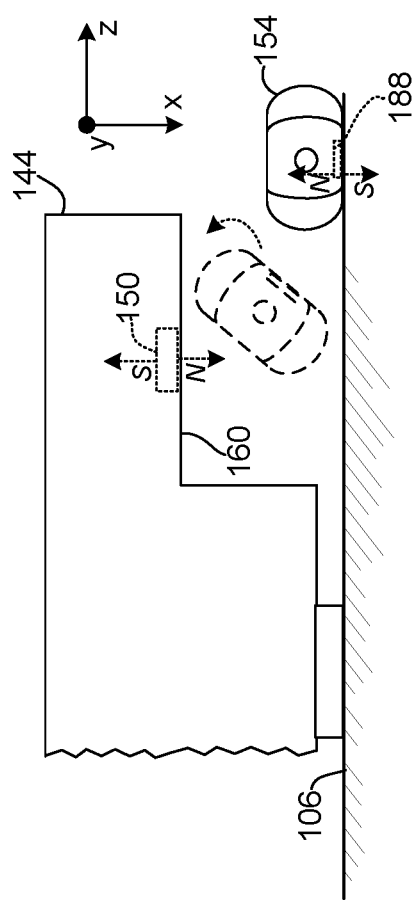
FIG. 24 schematically shows a stylus being automatically rotated and attached to the computing device according to examples of the present disclosure.

With reference now to FIG. 24, in some examples the stylus 154 may be placed on the supporting surface 106 in the opposite orientation, with the partner magnets 188, 192 adjacent to the supporting surface. In this orientation, and in another potential advantage of the present disclosure, when the stylus 154 is moved underneath the planar ceiling 160, the opposing polarities of the partner magnets 188, 192 and the two magnets 150, 152 in the overhanging brim 144 cause the stylus to rotate about its longitudinal axis in either a counter-clockwise direction (as illustrated) or clockwise direction and snap into place against the planar ceiling in the charging position as shown in FIG. 23. Accordingly, with this configuration the user may utilize this automatic attaching feature regardless of the orientation of the stylus 154 on the supporting surface 106.

Figure 25:
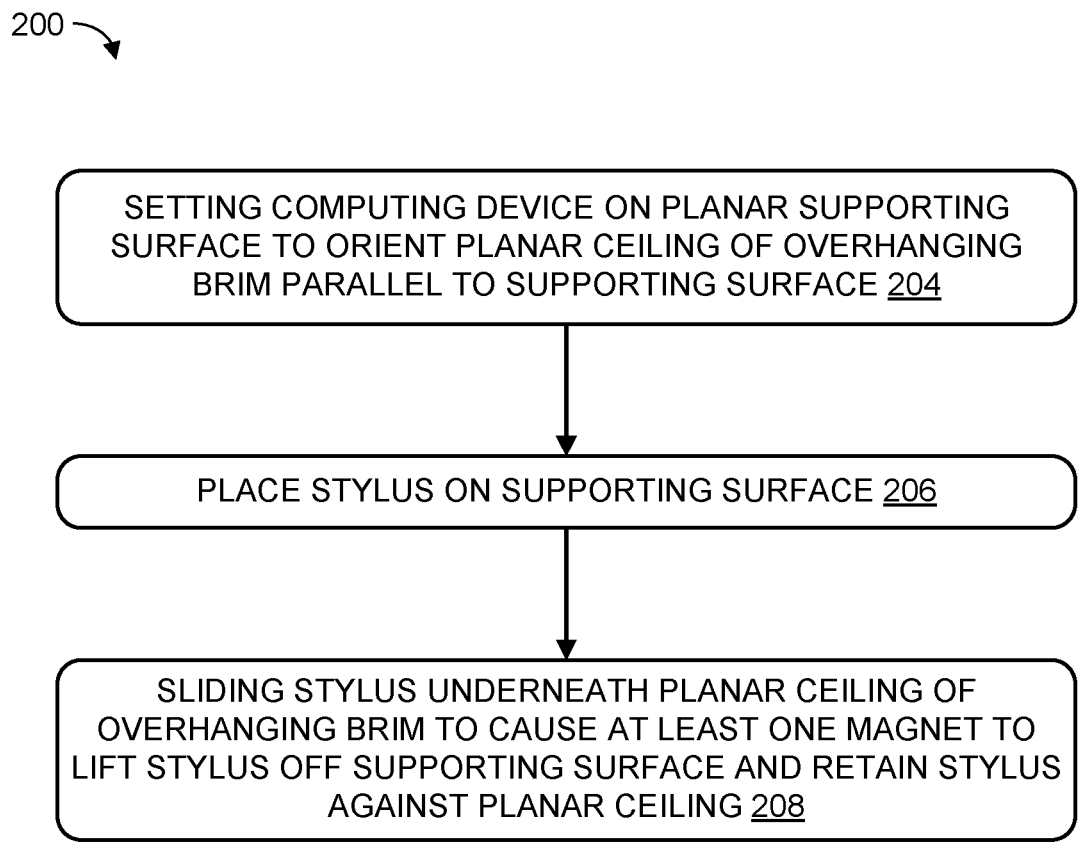
FIG. 25 illustrates an example method of removably attaching a stylus to a computing device according to examples of the present disclosure.

FIG. 25 illustrates an example method 200 of removably attaching a stylus to a computing device. Method 200 may be implemented using the example configurations of computing device 100 and stylus 154 as described above and other configurations as contemplated by the present disclosure. The following description of method 200 is provided with reference to the components described herein and shown in FIGS. 1-23.

It will be appreciated that the following description of method 200 is provided by way of example and is not meant to be limiting. Therefore, it is to be understood that method 200 may include additional and/or alternative steps relative to those illustrated in FIG. 25. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

At 204, method 200 includes setting the computing device on a planar supporting surface to orient the planar ceiling of the overhanging brim parallel to the supporting surface. At 206, method 200 includes placing the stylus on the supporting surface. At 208, the method 200 includes sliding the stylus underneath the planar ceiling of the overhanging brim to cause at least one magnet to lift the stylus off the supporting surface and retain the stylus against the planar ceiling.

Figure 26:
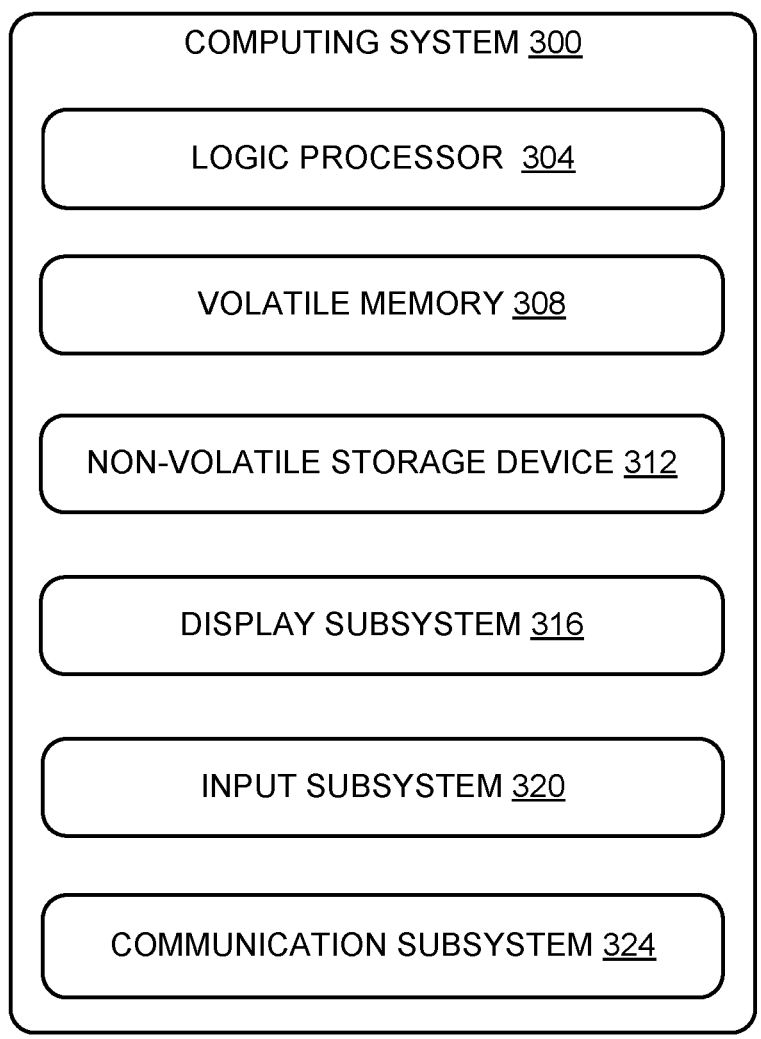
FIG. 26 is a block diagram of an example computing system according to examples of the present disclosure.

FIG. 26 schematically shows a non-limiting embodiment of a computing system 300 shown in simplified form. Computing system 300 may take the form of one or more styli or other input devices, personal computers, laptop computers, desktop computers, all-in-one displays, tablet computers, home-entertainment computers, gaming devices or consoles, mobile computing devices, mobile communication devices (e.g., smart phones), and/or other computing devices. In the above examples, computing device 100 and stylus 154 may comprise computing system 300 or one or more aspects of computing system 300.

Computing system 300 includes a logic processor 304, volatile memory 308, and a non-volatile storage device 312. Computing system 300 may optionally include a display subsystem 316, input subsystem 320, communication subsystem 324, and/or other components not shown in FIG. 26.

Logic processor 304 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 304 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 304 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 312 includes one or more physical devices configured to hold instructions executable by the logic processors to implement the methods and processes described herein. When such methods and processes are implemented, the state of non-volatile storage device 312 may be transformed—e.g., to hold different data.

Non-volatile storage device 312 may include physical devices that are removable and/or built-in. Non-volatile storage device 312 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 312 may include nonvolatile, dynamic, static, read/write, read-only, sequential-access, location-addressable, file-addressable, and/or content-addressable devices. It will be appreciated that non-volatile storage device 312 is configured to hold instructions even when power is cut to the non-volatile storage device 312.

Volatile memory 308 may include physical devices that include random access memory. Volatile memory 308 is typically utilized by logic processor 304 to temporarily store information during processing of software instructions. It will be appreciated that volatile memory 308 typically does not continue to store instructions when power is cut to the volatile memory 308.

Aspects of logic processor 304, volatile memory 308, and non-volatile storage device 312 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 316 may be used to present a visual representation of data held by non-volatile storage device 312. As the herein described methods and processes change the data held by the non-volatile storage device, and thus transform the state of the non-volatile storage device, the state of display subsystem 316 may likewise be transformed to visually represent changes in the underlying data. Display subsystem 316 may include one or more display devices utilizing virtually any type of technology. Such display devices may be combined with logic processor 304, volatile memory 308, and/or non-volatile storage device 312 in a shared enclosure, or such display devices may be peripheral display devices.

When included, input subsystem 320 may comprise or interface with one or more user-input devices such as a stylus, touchpad, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 324 may be configured to communicatively couple various computing devices described herein with each other, and with other devices. Communication subsystem 324 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides a computing device, comprising: a base comprising: a base surface configured to support the computing device on a supporting surface; and a front wall adjoining and extending away from the base surface; and a chassis adjoining the base, the chassis comprising: a planar user interactive surface comprising one or more user input components; and an overhanging brim that extends beyond at least the front wall of the base and comprises at least one magnet configured to removably retain a stylus underneath the overhanging brim. The computing device may additionally or alternatively include, wherein a planar ceiling of the overhanging brim forms an L-shaped capture feature with the front wall of the base, and the at least one magnet is configured to removably retain the stylus against the planar ceiling. The computing device may additionally or alternatively include, wherein the overhanging brim is configured to at least partially shield the stylus from view when the stylus is retained against the planar ceiling and is viewed from above the planar user interactive surface. The computing device may additionally or alternatively include, wherein the planar ceiling extends perpendicularly from the front wall of the base. The computing device may additionally or alternatively include, wherein the planar ceiling comprises a plastic outer layer that overlies a metallic enclosure layer, the metallic enclosure layer comprising a cutout portion that houses a printed circuit board assembly. The computing device may additionally or alternatively include, wherein the at least one magnet is affixed to the printed circuit board assembly. The computing device may additionally or alternatively include, wherein the at least one magnet is two magnets, the computing device further comprising a wireless charging coil affixed to the printed circuit board assembly between the two magnets.

The computing device may additionally or alternatively include, wherein the overhanging brim is an enclosure containing additional components. The computing device may additionally or alternatively include, wherein a brim width of the overhanging brim is substantially equal to a stylus width of the stylus. The computing device may additionally or alternatively include, wherein a wall height of the front wall of the base is substantially equal to a stylus thickness of the stylus. The computing device may additionally or alternatively include a display rotatably coupled to the chassis. The computing device may additionally or alternatively include, wherein the one or more user input components comprise a trackpad and a keyboard. The computing device may additionally or alternatively include, wherein the trackpad is located between the keyboard and the overhanging brim.

Another aspect provides a computing device, comprising: a base comprising: a base surface configured to support the computing device on a supporting surface; and a front wall adjoining and extending away from the base surface; a chassis adjoining the base, the chassis comprising: a planar user interactive surface comprising a trackpad and a keyboard; and an overhanging brim comprising a planar ceiling that extends perpendicularly from at least the front wall of the base to form an L-shaped capture feature with the front wall, the overhanging brim comprising two magnets configured to removably retain a stylus against the planar ceiling; and a display rotatably coupled to the chassis. The computing device may additionally or alternatively include, wherein the planar ceiling comprises a plastic outer layer that overlies a metallic enclosure layer, the metallic enclosure layer comprising a cutout portion that houses a printed circuit board assembly. The computing device may additionally or alternatively include, wherein the two magnets are affixed to the printed circuit board assembly. The computing device may additionally or alternatively include a wireless charging coil affixed to the printed circuit board assembly between the two magnets. The computing device may additionally or alternatively include, wherein the overhanging brim is an enclosure containing additional components. The computing device may additionally or alternatively include, wherein a brim width of the overhanging brim is substantially equal to a stylus width of the stylus.

Another aspect provides a method of removably attaching a stylus to a computing device, the computing device comprising a base that comprises: a base surface configured to support the computing device on a supporting surface, and a front wall adjoining and extending away from the base surface; the computing device comprising a chassis adjoining the base, the chassis comprising: a planar user interactive surface comprising one or more user input components, and an overhanging brim comprising a planar ceiling that extends beyond at least the front wall of the base, the overhanging brim comprising at least one magnet, the method comprising: setting the computing device on a planar supporting surface to orient the planar ceiling of the overhanging brim parallel to the supporting surface; placing the stylus on the supporting surface; and sliding the stylus underneath the planar ceiling of the overhanging brim to cause the at least one magnet to lift the stylus off the supporting surface and retain the stylus against the planar ceiling.

It will be understood that the configurations and/or approaches described herein are exemplary in nature, and that these specific embodiments or examples are not to be considered in a limiting sense, because numerous variations are possible.

The subject matter of the present disclosure includes all novel and non-obvious combinations and sub-combinations of the various processes, systems and configurations, and other features, functions, acts, and/or properties disclosed herein, as well as any and all equivalents thereof.

The claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure. As used herein, the phrase "and/or" means any or all of multiple stated possibilities.

The invention claimed is:

1. A computing device, comprising:
a base comprising:
a base surface configured to support the computing device on a supporting surface; and
a front wall adjoining and extending away from the base surface; and
a chassis adjoining the base, the chassis comprising:
a planar user interactive surface comprising one or more user input components; and
an overhanging brim that extends beyond at least the front wall of the base and comprises at least one magnet configured to removably retain a stylus underneath the overhanging brim.

2. The computing device of claim 1, wherein a planar ceiling of the overhanging brim forms an L-shaped capture feature with the front wall of the base, and the at least one magnet is configured to removably retain the stylus against the planar ceiling.

3. The computing device of claim 2, wherein the overhanging brim is configured to at least partially shield the stylus from view when the stylus is retained against the planar ceiling and is viewed from above the planar user interactive surface.

4. The computing device of claim 2, wherein the planar ceiling extends perpendicularly from the front wall of the base.

5. The computing device of claim 4, wherein the planar ceiling comprises a plastic outer layer that overlies a metallic enclosure layer, the metallic enclosure layer comprising a cutout portion that houses a printed circuit board assembly.

6. The computing device of claim 5, wherein the at least one magnet is affixed to the printed circuit board assembly.

7. The computing device of claim 6, wherein the at least one magnet is two magnets, the computing device further comprising a wireless charging coil affixed to the printed circuit board assembly between the two magnets.

8. The computing device of claim 1, wherein the overhanging brim is an enclosure containing additional components.

9. The computing device of claim 1, wherein a brim width of the overhanging brim is substantially equal to a stylus width of the stylus.

10. The computing device of claim 1, wherein a wall height of the front wall of the base is substantially equal to a stylus thickness of the stylus.

11. The computing device of claim 1, further comprising a display rotatably coupled to the chassis.

12. The computing device of claim 1, wherein the one or more user input components comprise a trackpad and a keyboard.

13. The computing device of claim 1, wherein the trackpad is located between the keyboard and the overhanging brim.

14. A computing device, comprising:
a base comprising:
a base surface configured to support the computing device on a supporting surface; and
a front wall adjoining and extending away from the base surface;
a chassis adjoining the base, the chassis comprising:
a planar user interactive surface comprising a trackpad and a keyboard; and
an overhanging brim comprising a planar ceiling that extends perpendicularly from at least the front wall of the base to form an L-shaped capture feature with the front wall, the overhanging brim comprising two magnets configured to removably retain a stylus against the planar ceiling; and
a display rotatably coupled to the chassis.

15. The computing device of claim 14, wherein the planar ceiling comprises a plastic outer layer that overlies a metallic enclosure layer, the metallic enclosure layer comprising a cutout portion that houses a printed circuit board assembly.

16. The computing device of claim 15, wherein the two magnets are affixed to the printed circuit board assembly.

17. The computing device of claim 16, further comprising a wireless charging coil affixed to the printed circuit board assembly between the two magnets.

18. The computing device of claim 14, wherein the overhanging brim is an enclosure containing additional components.

19. The computing device of claim 14, wherein a brim width of the overhanging brim is substantially equal to a stylus width of the stylus.

20. A method of removably attaching a stylus to a computing device, the computing device comprising a base that comprises: a base surface configured to support the computing device on a supporting surface, and a front wall adjoining and extending away from the base surface; the computing device comprising a chassis adjoining the base, the chassis comprising: a planar user interactive surface comprising one or more user input components, and an overhanging brim comprising a planar ceiling that extends beyond at least the front wall of the base, the overhanging brim comprising at least one magnet, the method comprising:
setting the computing device on a planar supporting surface to orient the planar ceiling of the overhanging brim parallel to the supporting surface;
placing the stylus on the supporting surface; and
sliding the stylus underneath the planar ceiling of the overhanging brim to cause the at least one magnet to lift the stylus off the supporting surface and retain the stylus against the planar ceiling.

* * * * *